(12) United States Patent
Dasgupta et al.

(10) Patent No.: US 9,426,415 B2
(45) Date of Patent: *Aug. 23, 2016

(54) SYSTEM, METHOD AND ARCHITECTURE FOR IN-BUILT MEDIA ENABLED PERSONAL COLLABORATION ON ENDPOINTS CAPABLE OF IP VOICE VIDEO COMMUNICATION

(71) Applicant: ITTIAM SYSTEMS (P) LTD., Bangalore (IN)

(72) Inventors: Sattam Dasgupta, Bangalore (IN); Anil Kumar Agara Venkatesha Rao, Bagalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 381 days.

This patent is subject to a terminal disclaimer.

(21) Appl. No.: 13/763,739

(22) Filed: Feb. 11, 2013

(65) Prior Publication Data

US 2014/0184732 A1 Jul. 3, 2014

(30) Foreign Application Priority Data

Dec. 28, 2012 (IN) .............................. 5495/CHE/2012

(51) Int. Cl.
*H04N 7/14* (2006.01)
*H04L 29/06* (2006.01)
*H04L 12/18* (2006.01)

(52) U.S. Cl.
CPC ............... *H04N 7/14* (2013.01); *H04L 12/184* (2013.01); *H04L 12/1818* (2013.01); *H04L 65/1069* (2013.01); *H04L 65/4007* (2013.01); *H04L 65/4046* (2013.01); *H04N 7/148* (2013.01)

(58) Field of Classification Search
None
See application file for complete search history.

(56) References Cited

U.S. PATENT DOCUMENTS

| | | | | |
|---|---|---|---|---|
| 2007/0273755 A1* | 11/2007 | Yang | ................... | H04L 12/1822 348/14.08 |
| 2010/0064316 A1* | 3/2010 | Dai | ......................... | H04N 5/04 725/38 |
| 2010/0333127 A1* | 12/2010 | Scott | ....................... | G06Q 10/00 725/24 |
| 2011/0246172 A1* | 10/2011 | Liberman | ............. | G06F 17/289 348/14.09 |
| 2011/0267419 A1* | 11/2011 | Quinn | ....................... | H04N 7/15 348/14.08 |
| 2013/0339159 A1* | 12/2013 | Shaikh | ............... | G06Q 30/0643 705/14.73 |

* cited by examiner

*Primary Examiner* — Maria El-Zoobi
(74) *Attorney, Agent, or Firm* — Prakash Nama; Global IP Services, PLLC

(57) ABSTRACT

A system, method and architecture for in-built media enabled personal collaboration on endpoints are disclosed. In one embodiment, one or more personal communication modified video communication terminals (PCMVCTs), one or more of video communication terminals (VCTs), one or more of voices over IP communication terminals (VoCTs), one or more remote servers and/or one or more clients are communicatively coupled via an IP network. Further, the PCMVCT includes a personal collaboration enabling audio/video bridging module (PCEAVBM). Furthermore, the personal collaboration between participants while providing an audio/video bridging of incoming audio/video streams from the one or more PCMVCTs, one or more of VCTs and VoCTs via the IP network is enabled by the PCEAVBM.

27 Claims, 4 Drawing Sheets

SYSTEM, METHOD AND ARCHITECTURE FOR IN-BUILT MEDIA ENABLED PERSONAL COLLABORATION ON ENDPOINTS CAPABLE OF IP VOICE VIDEO COMMUNICATION

RELATED APPLICATION

Benefit is claimed under 35 U.S.C 119(a) to Indian Provisional Application Ser. No. 2887/CHE/2010 entitled "Technique for providing in-built n-way audio/video bridge on endpoints capable of IP video communication" by Ittiam Systems (P) Ltd filed on Sep. 29, 2010, to U.S. patent application Ser. No. 12/983,334 entitled "Technique for providing in-built audio/video bridge on endpoints capable of video communication over IP" by Ittiam Systems (P) Ltd filed on Jan. 3, 2011 and to Indian Non-Provisional Application Ser. No. 5495/CHE/2012 entitled "SYSTEM, METHOD AND ARCHITECTURE FOR IN-BUILT MEDIA ENABLED PERSONAL COLLABORATION ON ENDPOINTS CAPABLE OF IP VOICE VIDEO COMMUNICATION" by Ittiam Systems (P) Ltd filed on Dec. 28, 2012.

FIELD OF TECHNOLOGY

Embodiments of the present invention relate to the field of audio/video communications. More particularly, embodiments of the present invention relate to media enabled personal collaboration on endpoints that are capable of Internet protocol (IP) video communication.

BACKGROUND

With continued globalization the need for personal and business interaction between people in real time over long distances is steadily increasing. Voice communication is still the primary mode for achieving the interaction. However, increasingly the voice communication is being supplemented by chat sessions including text, audio and video. Lately, there has also been an increasing usage of video conferencing for an improved quality of interaction using software applications like Skype™ to high end dedicated conferencing setups like in tele-presence.

Despite such advances, the interactions between people in real time are primarily limited to increased effectiveness in communication between people located at different places. Such interactions have not been able to achieve a shared experience people get in real time when they are located at the same place. In recent years, new products and services, such as Hangout™ from Google™ allow sharing of audio, video, and image content with video conferencing to enable a collaboration experience. However, such products and/or services require users to subscribe to a centralized service.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system, method and architecture for in-built media enabled personal collaboration on endpoints that are capable of Internet protocol (IP) video communication are disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "endpoints" refers to video communication terminals (VCTs), voice over IP communication terminals (VoCTs), and personal collaboration modified VCTs (PCM-VCTs) which can be standalone or part of another system e.g. an automobile. Exemplary VCTs include terminals capable of video communication over IP including desktop video phones, mobile or cell phones, tablets, video conferencing units and the like. The VoCTs include terminals capable of audio communication over IP. The term "bridge" refers to conferencing more than two endpoints capable of communication over IP.

The terms "signal" and "stream" are used interchangeably throughout the document. Also, the terms "endpoints" and "participants" are used interchangeably throughout the document.

Figure 1:
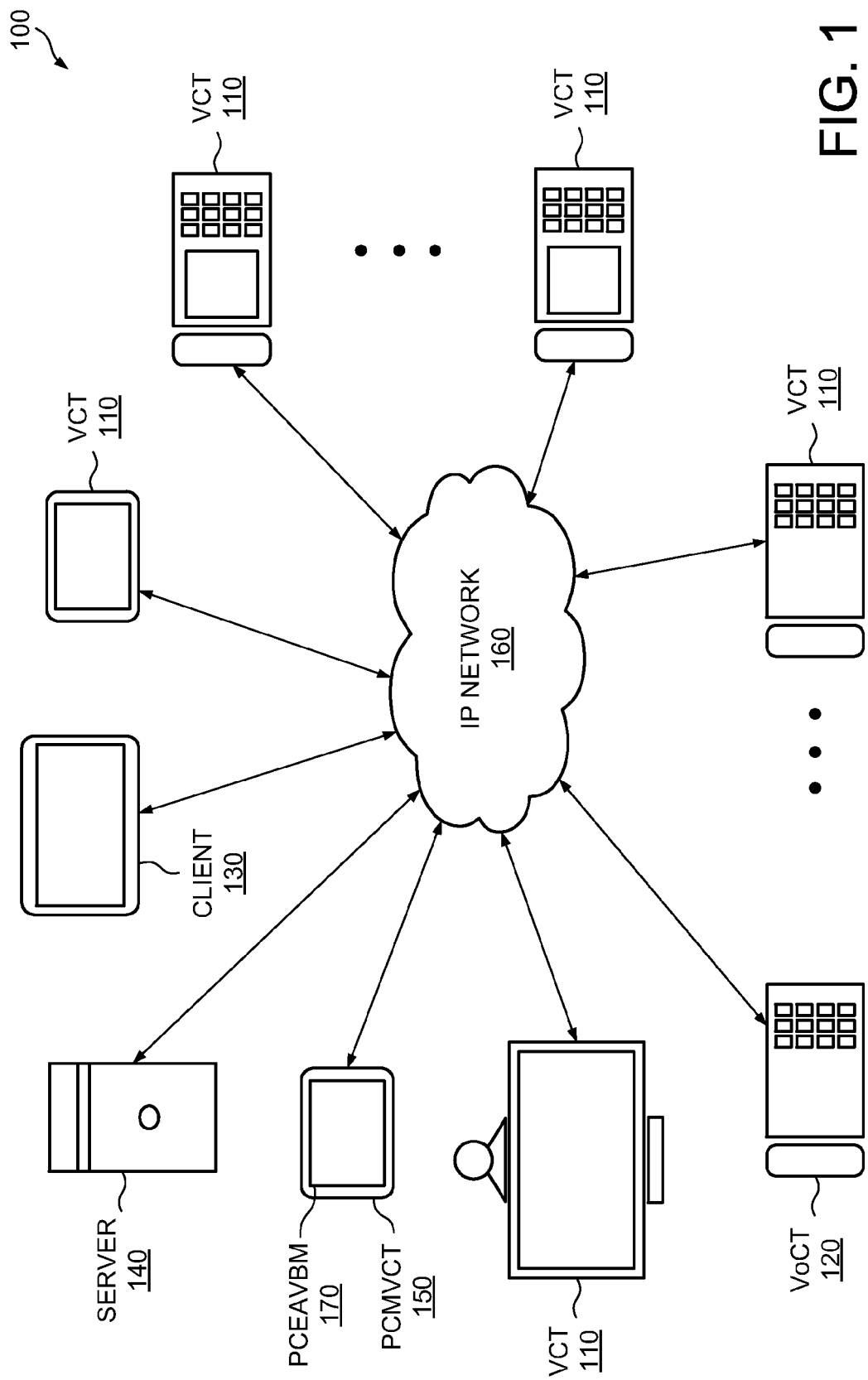
FIG. 1 illustrates a block diagram of a system for in-built media enabled personal collaboration on endpoints, according to an embodiment.

The present invention provides an in-built media-enabled personal collaboration on endpoints that are capable of video communication over IP. FIG. 1 is a block diagram of a video communication network 100 capable of providing in-built media-enabled personal collaboration, according to one embodiment. Particularly, the video communication network 100 includes a personal collaboration modified video communication terminal (PCMVCT) 150, one or more VCTs 110, zero or more VoCTs 120, zero or more remote server 140, zero or more client 130 connected via an IP network 160. Exemplary VCTs are any terminals capable of video communication over IP including desktop video phones, mobile or cell phones, tablets, video conferencing units, personal computers, smart televisions and the like. Further, the PCMVCT 150 includes an in-built personal collaboration enabled audio/video bridging module (PCEAVBM) 170 which enables personal collaboration by decoding and rendering media coming to PCMVCT 150 from the one or more VCTs 110 and/or the zero or more VoCTs 120, via the IP network 160 and/or one or more local and/or remote sources, which is explained in more detail with reference to FIGS. 2 and 3. Furthermore, the PCEAVBM 170 can be implemented as software, hardware or a combination of software and hardware. Also, the PCEAVBM 170 can be installed in any other VCTs 110 and/or VoCTs 120, in the video communication network 100, to act as a PCMVCT 150.

Figure 2:
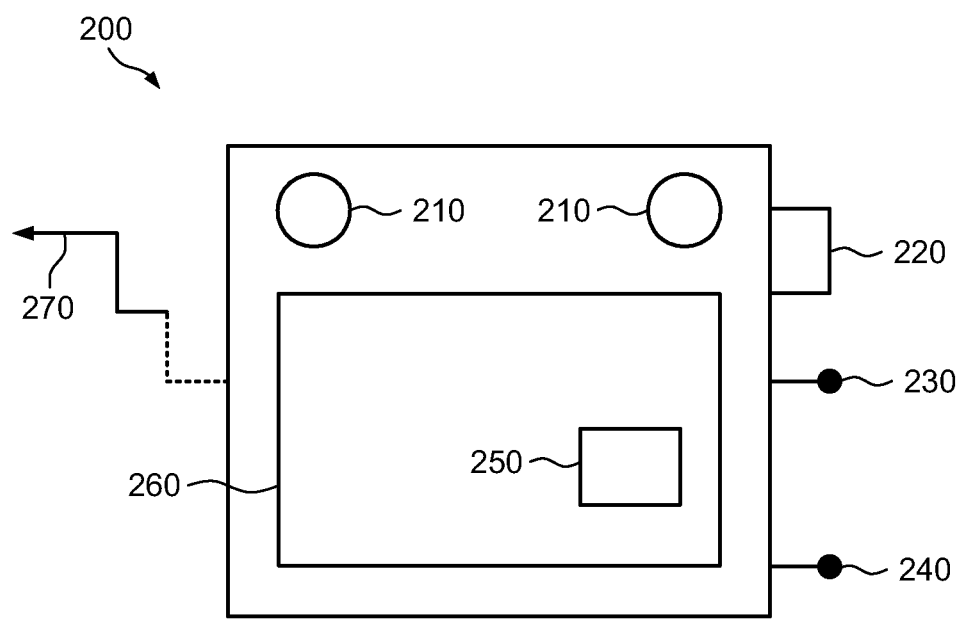
FIG. 2 illustrates a block diagram of an endpoint including major components that are needed for in-built media enabled personal collaboration on endpoints, according to one embodiment.

FIG. 2 illustrates input/output requirements, major functions, and hardware and software components of an endpoint, such as a VCT or a VoCT, for carrying out the personal collaboration between participants, according to an embodiment of this disclosure. As shown in FIG. 2, the generic end point includes zero or more cameras 210, zero or more built-in or removable storage devices for storing media/graphics content 220, zero or more audio/video in interfaces 230, zero or more audio/video out interfaces 240, one or more programmable processors capable of processing digital media 250, zero or more displays 260, and one or more internet protocol (IP) network connections 270. As an example VCT includes one or more cameras 210, zero or more built-in or removable storage devices for storing media/graphics content 220, zero or more audio/video in interfaces 230, zero or more audio/video out interfaces 240, one or more programmable processors capable of processing digital media 250, one or more displays 260, and one or more internet protocol (IP) network connections 270. As an example VoCT includes zero or more cameras 210, zero or more built-in or removable storage devices for storing media/graphics content 220, zero or more audio/video in interfaces 230, zero or more audio/video out interfaces 240, one or more programmable processors capable of processing digital media 250, one or more displays 260, and one or more internet protocol (IP) network connections 270. Exemplary endpoints, such as VCTs or VoCTs are any terminals/devices/apparatus capable of video communication over IP including desktop video phones, mobile or cell phones, tablets, video conferencing units, personal computers, smart televisions and the like. It can be envisioned that the terminals/devices/apparatus can be handheld or portable devices, or part of another system as well. It can also be envisioned that the endpoint shown in FIG. 2, can be a PCMVCT 150 including an embedded PCEAVBM 170 (shown in FIG. 1) that can enable a user of the endpoint to collaborate with one or more participants having any standard based interoperable VCTs or VoCTs.

Figure 3:
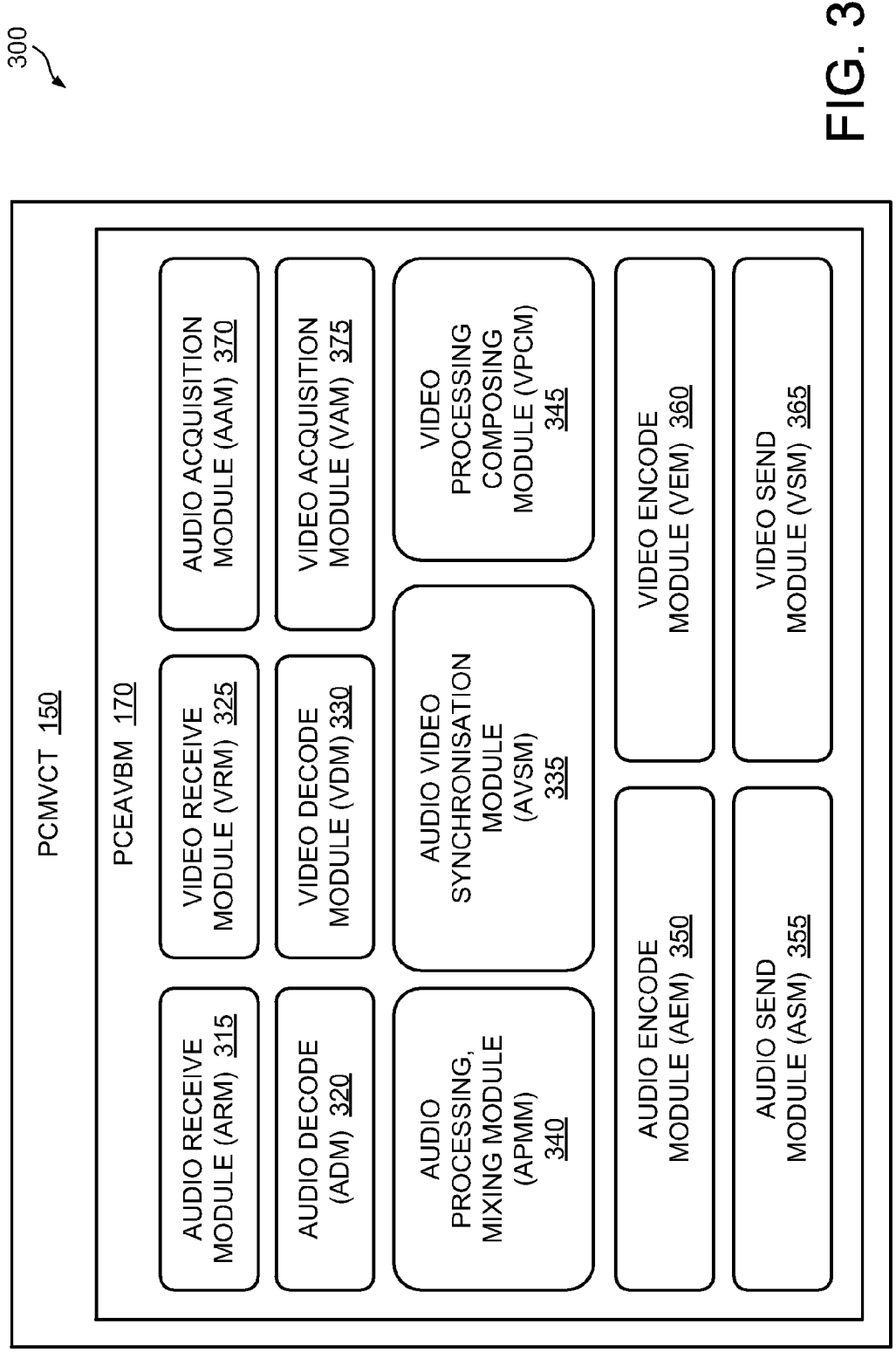
FIG. 3 *illustrates* major functional sub-components of a personal collaboration enabling audio/video bridging module (PCEAVBM PCEAVBM) that resides in a personal collaboration modified video conference terminal (PCMVCT PCMVCT), such as shown in FIG. 1, for enabling in-built personal collaboration on endpoints, with or without asymmetric audio/video formats and resolutions, based on the processing capability of the PCMVCT, according to one embodiment.

FIG. 3 illustrates major functional sub-components of the PCEAVBM 170, shown in FIG. 1 that is capable of carrying out personal collaboration on endpoints, with or without asymmetric audio/video streams based on the processing capability of the PCMVCT 150, according to one embodiment. The term "asymmetric audio/video streams" refers to audio/video streams coming from each endpoint being different from each other in format, frame rate, resolution, bit rate and the like. As shown in FIG. 3, the PCMVCT 150 includes the PCEAVBM 170. The PCEAVBM 170 enables the in-built audio/video bridging capability in the PCMVCT 150.

In this embodiment, the PCEAVBM 170 includes an audio receive module (ARM) 315, an audio decode module (ADM) 320, an audio processing and mixing module (APMM) 340, an audio encode module (AEM) 350 and an audio send module (ASM) 355 to receive, decode, process, encode and send the audio streams. Further in this embodiment, the PCEAVBM 170 includes a video receive module (VRM) 325, a video decode module (VDM) 330, a video processing and composing module (VPCM) 345, a video encode module (VEM) 360 and a video send module (VSM) 365 to receive, decode, process, encode and send the video streams. Further-more in this embodiment, the PCEAVBM 170 includes an audio/video synchronizing module (AVSM) 335 to synchronize the audio and the video streams. In addition in this embodiment, the PCEAVBM 170 includes an audio acquisition module (AAM) 370 and a video acquisition module (VAM) 375 for acquiring audio from one or more audio channels or video from one or more video channels, respectively, from the endpoint performing as PCMVCT 150.

In one embodiment, the ARM 315 enables the PCMVCT 150 to receive multiple audio streams in different formats, from the one or more VCTs 110 and the one or more VoCTs 120, and, if required, de-jitters each audio stream independently. Further, the ADM 320 enables decoding fully or partially each of the de-jittered audio stream. The VRM 325 enables the PCMVCT 150 to receive multiple video streams in different formats and resolutions, from the one or more VCTs 110, and, if required, de-jitters each video stream independently. Further, VDM 330 enables decoding fully or partially each of the de-jittered video stream.

Further in this embodiment, the AVSM 335 synchronizes each of the decoded audio/video streams of the participants connected to the PCMVCT 150 before local play out. Furthermore, the AVSM 335 synchronizes the audio/video streams before encoding and streaming out for each of the one or more VCTs 110 and the one or more VoCTs 120 connected to the PCMVCT 150. Also, the AVSM 335 works across all the other sub-components of the PCEAVBM 170 to track and re-timestamp the audio/video streams as required, in order achieving audio/video synchronization of the transmitted streams.

Furthermore in this embodiment, the APMM 340 enables post processing of the audio stream coming from each connected VCTs 110 and/or VoCTs 130A-N before playback and/or re-encoding. Exemplary post-processing includes mixing the incoming audio streams based on a weighted averaging for adjusting the loudness of the audio stream coming from each connected one or more VCTs 110 or one or more VoCTs 120. Moreover, the APMM 340 produces separate audio stream specific to each connected one or more VCTs 110 and one or more VoCTs 120 by removing an audio stream originating from that VCT or VoCT and mixing the audio streams coming from one or more other connected one or more VCTs 110 and/or the one or more VoCTs 120.

In addition in this embodiment, the VPCM 345 enables processing the decoded video streams received from the VDM 330. The processing of the decoded video streams includes processes, such as resizing the video streams and composing the video streams. Exemplary composing of the video streams includes tiling the video streams. Furthermore in this embodiment, the AEM 350 enables encoding each of the audio streams coming from the APMM 340, separately, in a format required by each of the associated and connected one or more of VCTs 110 and the one or more of VoCTs 120. In one embodiment, the AEM may encode only one audio stream that is sent out to multiple VCTs or VoCTs or clients, depending on the use-case. In addition in this embodiment, the ASM 355 enables receiving each of the audio streams from the AEM 350 and sending the encoded audio streams to each of the associated one or more of VCTs 110 and the one or more of VoCTs 120.

Moreover in this embodiment, the VEM 360 enables encoding each of the composed video streams coming from the VPCM 345 in a format and resolution supported by each of the associated and connected one or more VCTs 110. In one embodiment, the VEM may encode only one stream that will be sent to all the connected VCTs and clients. Further in this embodiment, the VSM 365 enables receiving each of the encoded video streams from the VEM 360 and sending them to associated one or more VCTs 110.

In addition in this embodiment, the Audio Acquisition Module (AAM) 370 is responsible for acquiring one or more channels of audio from the end point performing the PC functionality, such as PCMVCT. In one embodiment, the AAM acquires uncompressed (RAW) audio of the local participant from the audio capture as well as the decompressed (RAW) audio being played out from a media (audio only or audio- and video) file on the PCMVCT. The media file could be on a local storage of the PCMVCT or can come from an external remote server 140, such as shown in FIG. 1. The AAM then delivers these one or more channels of uncompressed audio to the APMM module. In one exemplary embodiment, the AAM may even acquire a compressed audio stream and deliver it directly to the ASM for packetization and streaming out, bypassing the APPM and AEM.

Further in this embodiment, the Video Acquisition Module (VAM) is responsible for acquiring one or more channels of video from the end point performing the SC functionality, such as PCMVCT. In one embodiment, the VAM acquires uncompressed (RAW) video of the local participant from a camera capture as well as a decompressed (RAW) video being rendered out from a media file on the PCMVCT. The media file could be on the local storage of the PCMVCT or can come from the external server 140, such as shown in FIG. 1. The VAM then delivers the one or more channels of uncompressed video to the VPCM module. In another embodiment, the VAM captures just one channel of the entire or selected sections of the display area being rendered on the PCMVCT. In one exemplary embodiment, the VAM may even acquire a compressed video stream and deliver it directly to the VSM for packetization and streaming out, bypassing the VPCM and VEM In the embodiment, where the video camera capture and the movie rendering signals are captured as two separate channels, the VPCM can be used to compose the viewing layout to the VCTs that are in communication with the PCM-VCT to be different from the viewing layout on the local display of the PCMVCT itself. Whereas, in the embodiment, where only one channel of uncompressed signal of the video is getting rendered on the PCMVCT is captured, the viewing layout to the VCTs that are in communication with the PCM-VCT may be the same as the viewing layout on the local display of the SMVCT itself.

In one embodiment, the SMVCT can also be configured to send out the compressed audio and video signals to one or more media clients to perform decode and render only functionality.

Figure 4:
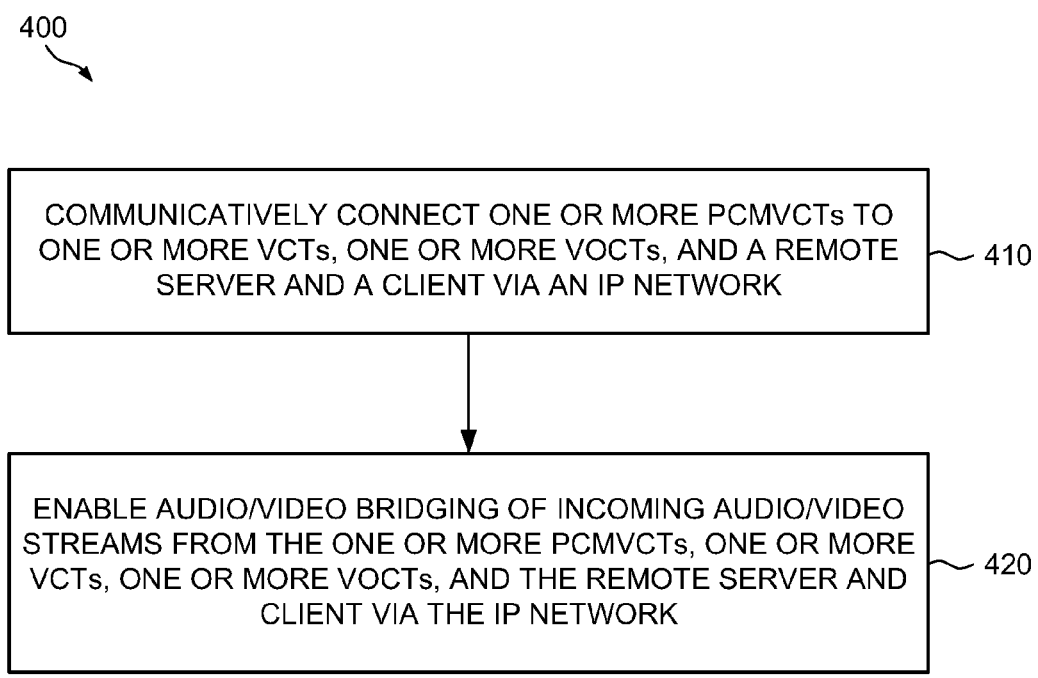
FIG. 4 illustrates a process flow for in-built media enabling personal collaboration on endpoints that are capable of IP video communication, according to one embodiment.

FIG. 4 is a process flow 400 illustrating providing of in-built media enabled personal collaboration on endpoints capable of IP video communication, according to one embodiment. In block 410, one or more personal collaboration modified video communication terminals (PCMVCTs) are communicatively coupled to one or more of video communication terminals (VCTs), one or more of voice over IP communication terminals (VoCTs), one or more remote servers, and/or one or more clients via an internet protocol (IP) network, wherein each PCMVCT includes an personal collaboration enabling audio/video bridging module (PCEAVBM). In block 420, the audio/video bridging of incoming audio/video streams from the one or more PCM-VCTs, one or more VCTs, one or more VoCTs, and/or one or more remote servers are enabled via the IP network by the PCEAVBM for personal collaboration between participants. The details of the operation of in-built media enabled personal collaboration on endpoints capable of IP video communication is explained in more details with reference to FIGS. 1-3.

The present invention provides a system and method for enabling in-built personal collaboration (SC) capability using a SC engine (SCE), such as PCEAVBM in any endpoint having electronics capable of carrying out video communication and capture and/or store and/or receive and/or process audio-visual and/or graphical content. Personal collaboration capability of the above technique allows the user of an endpoint to share the captured/stored/received/processed media content in real-time with other users at different locations around the world having IP video communication capable terminals (VCT) or endpoints and substantially simultaneously converse with each other having a shared real time experience similar to the experience of all the users being at the same location, without requiring any external hardware and/or service to enable the same. For example, the user of the SC capable tablet can watch a movie on his tablet and simultaneously share it with his friends at different locations who can watch it together on their IP video communication capable tablets/mobile/TV and the like and at the same time converse with each other, just like they would do if they were sitting next to each other. In another example, a user while taking vacation snaps on his SC capable camera can simultaneously share it with their friends at different locations who can watch it together on their IP video communication capable mobiles, tablets and/or personal computers and the like and see each other and converse on the shared pictures at the same time. In another example, a student while studying his electronic version of the text book on a SC capable e-book reader can simultaneously share it with his fellow students at different locations who can read it together on their IP video communication capable tablets or personal computers etc. and simultaneously discuss with each other about the subject, just like they would if they were next to each other. In one embodiment of deployment, where there could be more than one PCMVCT in the network, the current invention also provides a method to not only view, but also control the applications and screen of the other participants. For example, in one embodiment, two or more people having PCMVCTs with each other can view, collaborate and annotate on a picture or a map about a location to get a truly 'being together' experience. In another embodiment, the PCMVCT can provide appropriate Application Programmable Interfaces (APIs) to enable users to write and/or install applications on PCMVCTs to have a tight integration of a shared experience. For example, users can write and/or install games made specifically for PCMVCT to transfer the signals between one or more participants having PCMVCTs to experience a multi-player game as if they are at the same location.

In various embodiments, the systems, methods, architectures described in FIGS. 1 through 4 provide in-built personal collaboration (SC) capability using a SC engine (SCE), such as PCEAVBM in any endpoint, such as PCMVCT having embedded hardware and software capable of video communication and capture, store, receive, process audio-visual and/or graphical content. Personal collaboration capability of the above described techniques allows the user of the endpoint to share the captured, stored, received, and/or processed content in real time with participants at different locations around the world having IP video communication capable terminals (VCT) or endpoints and simultaneously converse with them and hence have a shared real time experience similar to the experience of all the participants being in the same location, without requiring any external hardware and/or service to enable the personal experience. For example, the user of the SC capable tablet can watch a movie on his tablet and substantially simultaneously share it with his friends at different locations and watch the movie together using their IP video communication capable endpoints, such as tablets, mobile devices, TVs and the like and at the same time converse with each other, just like they would do if they were sitting next to each other in the same location. In another example, a user while taking vacation snaps on his SC capable camera can simultaneously share it with friends at different locations who can all watch it together on their IP video communication capable endpoints, such as mobile devices, tablets, personal computers and the like and see each other and converse on the shared pictures at the same time. In yet another example, a student while studying his electronic version of the text book on a SC capable e-book reader can simultaneously share it with his fellow students at different locations and read the e-book together on their IP video communication capable tablets, personal computers and so on and simultaneously discuss with each other about the book, just like they would if they were to be sitting next to each other.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for in-built media enabled personal collaboration on endpoints, comprising:
    communicatively connecting one or more personal collaboration modified video communication terminals (PCMVCTs) to one or more of video communication terminals (VCTs), one or more of voice over internet protocol (IP) communication terminals (VoCTs), one or more remote servers, and/or one or more clients via an IP network, wherein each PCMVCT includes an personal collaboration enabling audio/video bridging module (PCEAVBM); and
    enabling the audio/video bridging of incoming audio/video streams from the one or more PCMVCTs, one or more VCTs, one or more VoCTs, one or more clients, and/or one or more remote servers, on one of the PCMVCTs via the IP network by the PCEAVBM for personal collaboration between participants, wherein the audio/video bridging enables the one or more PCMVCTs, one or more VCTs, one or more VoCTs, one or more clients, and/or one or more remote servers to share content with each other and simultaneously converse on the shared content with each other.

2. The method of claim 1, wherein the PCEAVBM includes an audio receive module (ARM) for enabling the PCMVCT to receive multiple audio streams and de-jitter each audio stream independently, and wherein the PCEAVBM further includes an audio decode module (ADM) for decoding fully or partially each de-jittered audio stream.

3. The method of claim 2, wherein the PCEAVBM further includes a video receive module (VRM) for enabling the PCMVCT to receive multiple video streams and de-jitter each video stream independently, and wherein the PCEAVBM further includes a video decode module (VDM) for decoding fully or partially each de-jittered video stream.

4. The method of claim 3, wherein the PCEAVBM further includes an audio/video synchronizing module (AVSM) for synchronizing each of the decoded streams of each participant connected to the PCMVCT before local play out, and wherein the AVSM further synchronizes the audio/video streams before encoding and streaming out to each connected VCT and/or VoCT.

5. The method of claim 4, wherein the PCEAVBM further includes an audio processing and mixing module (APMM) for post processing the audio stream coming from each connected VCTs or VoCTs before playback and/or re-encoding, and wherein the APMM produces separate audio stream specific to each connected VCTs or VoCTs by removing an audio stream originating from that VCT or VoCT and mixing the audio streams coming from one or more other VCTs and/or VoCTs.

6. The method of claim 5, wherein the PCEAVBM further includes a video processing and composing module (VPCM) for processing the decoded video streams received from the VDM and wherein the processing the decoded video streams include processes selected from the group consisting of resizing the video streams, and composing the video streams.

7. The method of claim 6, wherein the PCEAVBM further includes an audio encode module (AEM) for encoding each of the audio streams coming from the APMM in a format required by each of the associated and connected VCTs and VoCTs, and wherein the PCEAVBM further includes an audio send module (ASM) for receiving each of the audio streams from the AEM and sending the encoded audio streams to each of the associated VCTs and VoCTs.

8. The method of claim 7, wherein the PCEAVBM further includes a video encode module (VEM) for encoding each of the composed video streams coming from the VPCM in a format supported by each of the associated and connected VCTs, and wherein the PCEAVBM further includes a video send module (VSM) for receiving each of the encoded video streams from the VEM and sending them to respective VCTs.

9. The method of claim 8, wherein the PCEAVBM further includes an audio acquisition module (AAM) for acquiring one or more channels of audio streams from the one or more PCMVCTs.

10. The method of claim 9, wherein the PCEAVBM further includes a video acquisition module (VAM) for acquiring one or more channels of video streams from the one or more PCMVCTs.

11. A non-transitory computer-readable storage medium for in-built media enabling personal collaboration on endpoints having instructions that when executed by a computing device, cause the computing device to perform a method comprising:
    communicatively connecting one or more personal collaboration modified video communication terminals (PCMVCTs) to one or more of video communication terminals (VCTs), one or more of voice over internet protocol (IP) communication terminals (VoCTs), one or more remote servers, and/or one or more clients via an IP network, wherein each PCMVCT includes an personal collaboration enabling audio/video bridging module (PCEAVBM); and
    enabling the audio/video bridging, of incoming audio/video streams from the one or more PCMVCTs, one or more VCTs, one or more VoCTs, one or more clients, and/or one or more remote servers, on one of the PCMVCTs via the IP network by the PCEAVBM for personal collaboration between participants, wherein the audio/video bridging enables the one or more PCMVCTs, one or more VCTs, one or more VoCTs, one or more clients, and/or one or more remote servers to share content with each other and simultaneously converse on the shared content with each other.

12. The non-transitory computer-readable storage medium of claim 11, wherein the PCEAVBM further includes an audio acquisition module (AAM) for acquiring one or more channels of audio streams from the one or more PCMVCTs.

13. The non-transitory computer-readable storage medium of claim 11, wherein the PCEAVBM further includes a video acquisition module (VAM) for acquiring one or more channels of video streams from the one or more PCMVCTs.

14. A system for in-built media enabled personal collaboration on endpoints, comprising:
   one or more of video communication terminals (VCTs);
   one or more voice over internet protocol (IP) communication terminals (VoCTs);
   one or more IP networks;
   one or more remoter servers;
   one or more clients; and
   one or more personal collaboration modified video communication terminals (PCMVCTs), wherein the one or more of VCTs, and the one or more PCMVCTs are coupled via the one or more IP networks, and wherein the PCMVCT comprises:
      a personal collaboration enabling audio/video bridging module (PCEAVBM) for in-built media enabling personal collaboration on the endpoints, wherein the PCEAVBM enables audio/video bridging, of incoming audio/video streams from the one or more PCMVCTs, the one or more VCTs, the one or more VoCTs, and/or the one or more remote servers, on one of the PCMVCTs via the IP network to share content with each other and simultaneously converse on the shared content with each other.

15. The system of claim 14, further comprising:
   devices selected from the group consisting of one or more dedicated bridges, one or more voice over Internet protocol communication terminals (VoCTs) and one or more IP network devices and wherein the devices are coupled via the one or more IP networks.

16. The system of claim 15, wherein the PCEAVBM comprises:
   an audio receive module (ARM) to enable the corresponding one of the one or more PCMVCTs to receive multiple audio streams and de-jitter each audio stream independently; and
   an audio decode module (ADM) to decode fully or partially each de-jittered audio stream.

17. The system of claim 16, wherein the PCEAVBM further comprises:
   a video receive module (VRM) to enable the corresponding one of the one or more PCMVCTs to receive multiple video streams and de-jitter each video stream independently; and
   a video decode module (VDM) to decode fully or partially each de-jittered video stream.

18. The system of claim 17, wherein the PCEAVBM further comprises:
   an audio/video synchronizing module (AVSM) to synchronize each of the decoded audio/video streams of each participant connected to the corresponding one of the one or more PCMVCTs before local play out, and wherein the AVSM further synchronizes the audio/video streams before encoding and streaming out to each of the connected one or more VCTs and/or one or more VoCTs.

19. The system of claim 18, wherein the PCEAVBM further comprises:
   an audio processing and mixing module (APMM) to post process the audio stream coming from each connected one or more VCTs or one or more VoCTs before playback and/or re-encoding, and wherein the APMM produces separate audio stream specific to each connected one or more VCTs or one or more VoCTs by removing an audio stream originating from that VCT or VoCT and mixing the audio streams coming from one or more other VCTs and/or VoCTs.

20. The system of claim 19, wherein the PCEAVBM further comprises:
   a video processing and composing module (VPCM) to process the decoded video streams received from the VDM and wherein the processing the decoded video streams include processes selected from the group consisting of resizing the video streams and composing the video streams.

21. The system of claim 20, wherein the PCEAVBM further comprises:
   an audio encode module (AEM) to encode each of the audio streams coming from the APMM in a format required by each of the associated and connected one or more VCTs and one or more VoCTs; and
   an audio send module (ASM) to receive each of the encoded audio streams from the AEM and sending the received encoded audio streams to each of the associated one or more VCTs and one or more VoCTs.

22. The system of claim 21, wherein the PCEAVBM further comprises:
   a video encode module (VEM) to encode each of the composed video streams coming from the VPCM in a format supported by each of the associated and connected one or more VCTs; and
   a video send module (VSM) to receive each of the encoded video streams from the VEM and send each of the encoded video streams to associated and connected one or more VCTs.

23. The system of claim 22, wherein the PCEAVBM further includes an audio acquisition module (AAM) for acquiring one or more channels of audio streams from the one or more PCMVCTs.

24. The system of claim 23, wherein the PCEAVBM further includes a video acquisition module (VAM) for acquiring one or more channels of video streams from the one or more PCMVCTs.

25. A personal collaboration modified video communication terminal (PCMVCT), comprising:
   an in-built personal collaboration enabling audio/video bridging module (PCEAVBM) to enable encoding/decoding incoming audio/video streams coming from one or more video communication terminals (VCTs), one or more voice over internet protocol (IP) communication terminals (VoCTs), one or more PCMVCTs, one or more remote servers, and/or one or more clients via an IP network, and further configured to enable personal collaboration between participants associated with the one or more VCTs, the one or more VoCTs and the one or more PCMVCTs by audio/video bridging of incoming audio/video streams to the one or more PCMVCTs, wherein the audio/video bridging of incoming audio/video streams is enabled on one of the PCMVCTs via the IP network, and wherein the audio/video bridging enables the one or more PCMVCTs, one or more VCTs, one or more VoCTs, one or more clients, and/or one or more remote servers to share content with each other and simultaneously converse on the shared content with each other.

26. The PCMVCT of claim 25, wherein the PCEAVBM further includes an audio acquisition module (AAM) for acquiring one or more channels of audio streams from the one or more PCMVCTs.

27. The PCMVCT of claim 26, wherein the PCEAVBM further includes a video acquisition module (VAM) for acquiring one or more channels of video streams from the one or more PCMVCTs.

* * * * *